H. L. BETHEL.
CUSHION TIRE.
APPLICATION FILED MAR. 13, 1919.
1,366,051. Patented Jan. 18, 1921.
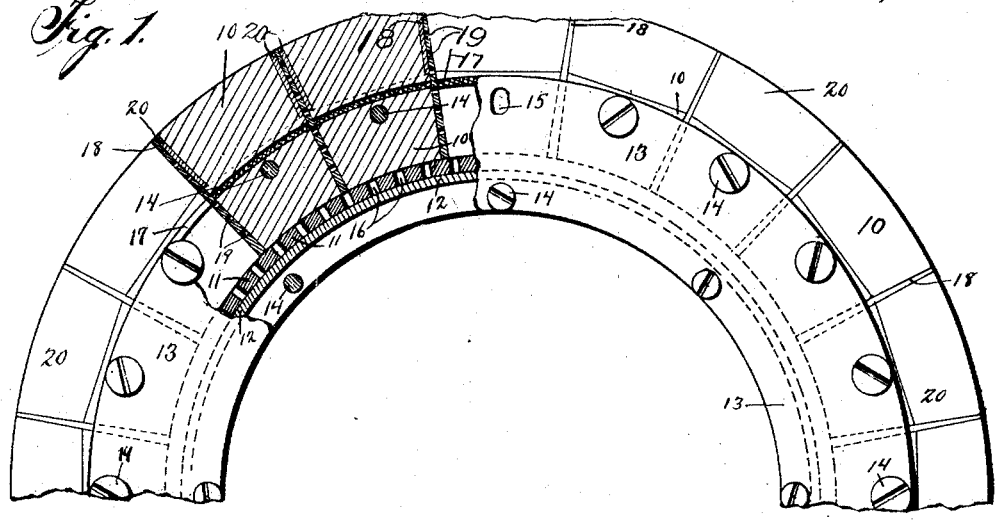
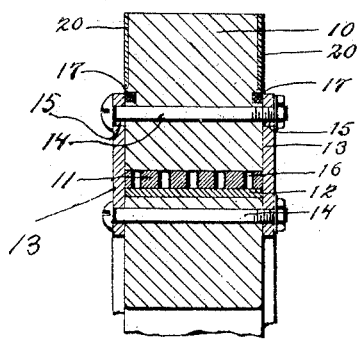

UNITED STATES PATENT OFFICE.

HARRY L. BETHEL, OF MILLVILLE, NEW JERSEY, ASSIGNOR OF ONE-THIRD TO JOSEPH B. SHARP AND ONE-THIRD TO CLAYTON E. WOODRUFF, BOTH OF BRIDGETON, NEW JERSEY.

CUSHION-TIRE.

1,366,051.  Specification of Letters Patent.  Patented Jan. 18, 1921.

Application filed March 13, 1919. Serial No. 282,265.

*To all whom it may concern:*

Be it known that I, HARRY L. BETHEL, of Millville, in the county of Cumberland, State of New Jersey, have invented a certain new and useful Improvement in Cushion-Tires, and do hereby declare that the following is a full, clear, and exact description thereof.

My invention relates to vehicle wheels, and in particular to those having elastic or cushion tires, and my object is to provide a cushion tire of the non-inflatable type which will afford all required elasticity, be inexpensive to construct and repair, and which will have ample wear-resisting capacity, and to this end, my invention consists in the construction substantially as hereinafter specified and claimed.

In the annexed drawings I show and I will describe one tire construction made in accordance with my invention, but without intending to limit or restrict myself only to that construction, for the principle of my invention may be embodied in various constructions. In such drawings:

Figure 1 is a side view of a portion of a tire, with parts in section;

Fig. 2 is a cross section thereof.

My tire comprises a shoe, that consists preferably, but not necessarily, of a circular series of similar blocks 10 of wood, or other suitable material placed about the wheel with a comparatively thin band 11 of rubber or other resilient material upon which the blocks bear on their inner ends and which provides the main cushioning means. The resilient band 11, encircles and rests upon a metal ring 12 of the same width, which is interposed between the band and the wheel felly. The blocks, band and ring, lie between two thin, ring-form plates 13 which overlap about half the blocks radially, and project inwardly beyond the ring 12 and overlap the wheel felly, and at intervals, transverse bolts 14 pass through alining holes 15 in the plates and holes in the interposed blocks, and in the plates and the interposed portions of the wheel felly. The plate holes 15 are elongated radially to allow radial movement or play of the blocks in the cushioning action of the tire. Since the elastic band, 11, is closely confined at its opposite edges between the sides of the plates 13, the band cannot expand laterally outward under pressure, and I therefore provide it with perforations or cells 16, to allow space for lateral yielding, under pressure from the blocks, so as to give the desired resiliency to the tire. Said perforations, or cells also imprison small bodies of air, that add to the cushioning effect. Besides being necessary to give adequate resiliency to the tire, the provision of the holes is a saving of rubber, and one of the important features of my invention is the economical use of rubber, not only for the reason just given, but also because the band itself is quite thin.

Preferably, to prevent sand or grit working between the sides of the blocks and the side plates 13, I interpose between blocks and plates at each side a packing ring 17 of suitable material. The respective rings being fitted in grooves in the block sides.

It it also preferable to interpose between adjacent blocks a thin filling strip 18 of rubber, or other elastic material, to add to the resiliency of the tire, and these filling strips may also be cellular, or perforated with holes 19. Said filling strips are preferably wedge shape, or tapering being thickest at their inner portions. It will be observed that the blocks, 10, by reason of the yieldability of the filling strips, 18, may have a slight rocking movement on the bolts, 14, which, of course, is cushioned by the strips, on the opposite sides of the block and also by the bearing of the block at its inner end upon the resilient band, 11, and thus the jarred effect of objects striking the periphery of the wheel at a tangent will be absorbed.

Preferably a band, or facing 20 of thin sheet steel is applied around the portion of each block beyond the side plates 13, to prevent splitting, and also to form shoes or wear surfaces to save the blocks from injury.

I claim:

1. A cushion tire comprising a circular series of blocks, and a cellular band of resilient material upon which said blocks bear at their inner ends, said blocks being supported for radial movement and also for rocking movement circumferentially of the tire, all such movements being yieldingly opposed by said band.

2. A cushion tire comprising a circular series of blocks, bolts passing through the blocks upon which they may rock in a direction circumferentially of the tire and on which they may move radially, and a cellular band of resilient material upon which said blocks bear at their inner ends, and strips of elastic material between adjacent blocks.

In testimony that I claim the foregoing I have hereunto set my hand.

HARRY L. BETHEL.